(12) United States Patent
Vig et al.

(10) Patent No.: US 11,604,809 B1
(45) Date of Patent: Mar. 14, 2023

(54) DISTRIBUTED DATABASE WITH REPLICA PLACEMENT CONTROL

(71) Applicant: Amazon Technologies, Inc., Seattle, WA (US)

(72) Inventors: Akshat Vig, Seattle, WA (US); Rashmi Krishnaiah Setty, Santa Clara, CA (US); Craig Wesley Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 17/011,758

(22) Filed: Sep. 3, 2020

(51) Int. Cl.
  *G06F 16/00* (2019.01)
  *G06F 16/27* (2019.01)
  *H04L 43/0805* (2022.01)

(52) U.S. Cl.
  CPC .......... *G06F 16/273* (2019.01); *G06F 16/27* (2019.01); *H04L 43/0805* (2013.01)

(58) Field of Classification Search
  CPC .............................. G06F 16/273; G06F 16/27

USPC ........................................................ 707/613
See application file for complete search history.

(56) References Cited

U.S. PATENT DOCUMENTS

| 9,053,167 | B1 * | 6/2015 | Swift ..................... G06F 16/27 |
| 9,350,682 | B1 * | 5/2016 | Gupta ................. G06F 9/45558 |
| 9,699,017 | B1 * | 7/2017 | Gupta ................. H04L 67/1097 |

* cited by examiner

*Primary Examiner* — Chelcie L Daye
(74) *Attorney, Agent, or Firm* — Davis Wright Tremaine LLP

(57) ABSTRACT

A distributed database management system comprises database nodes located in a plurality of availability zones. The system receives a request to store a table, and determines to store a number of replicas of the table in one or more availability zones. The system obtains information indicating that one of the availability zones has been designated as preferred. The system identifies a set of database nodes in the preferred availability zone, where the number of database nodes in the subset is sufficient to determine quorum among the replicas. The replicas are stored on the identified set of database nodes.

20 Claims, 9 Drawing Sheets

DISTRIBUTED DATABASE WITH REPLICA PLACEMENT CONTROL

BACKGROUND

Distributed database management systems are increasingly used for applications where performance and availability are important considerations. Distributed database systems that provide high availability are able to provide uninterrupted access to the data maintained by the system a high percentage of the time. In many systems, this is achieved by storing copies of the data in multiple, isolated locations. A failure or shutdown in one of these locations will not generally interrupt access to the data, because the data may still be accessed from the other locations. However, in some instances, this approach reduces the overall performance of the system.

BRIEF DESCRIPTION OF THE DRAWINGS

Various techniques will be described with reference to the drawings, in which.

DETAILED DESCRIPTION

Figure 1:
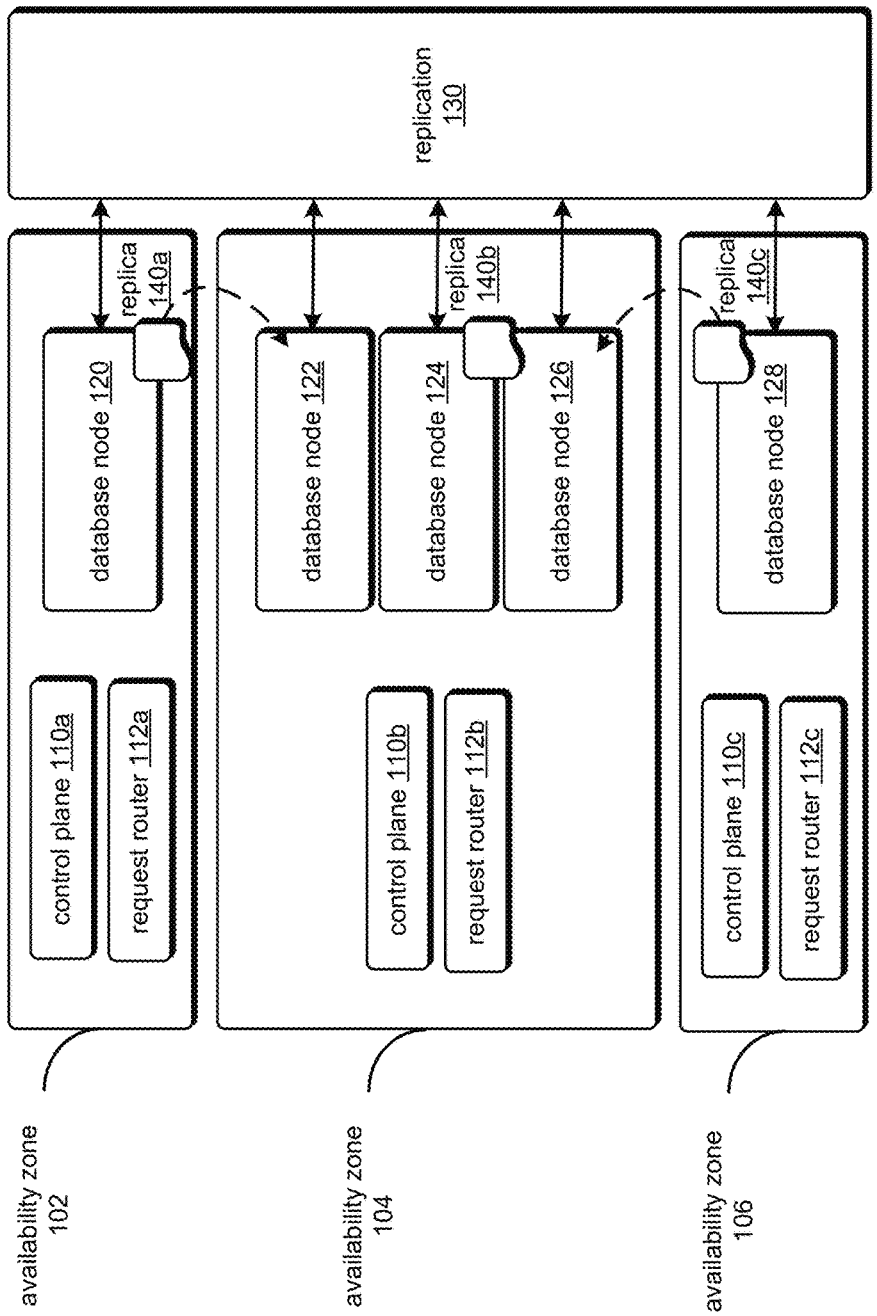
FIG. 1 illustrates an example of a distributed database system with an availability zone designated as preferred, according to at least one embodiment.

In an example embodiment, a distributed database system operates database nodes in a number of different availability zones. Each availability zone is independent of the others, so that a failure in one zone is unlikely to disrupt the operation of the database nodes in the other zone. A client of the distributed database may send to the distributed database a request to create a table. The request may include a parameter, flag, or other indication that one of the availability zones should be designated as preferred.

Internally, the distributed database creates the new table so that members of its replication group—database nodes that maintain copies, or replicas, of the table—are concentrated within the availability zone that was designated as preferred. For example, the distributed database system might place at least two out of three replicas on database nodes located in the preferred availability zone, and an additional replica on a database node outside of the preferred availability zone.

The distributed database system may store, in metadata describing the replication group, information indicating which availability zone is preferred. When a write request is received, the distributed database evaluates the write request based on this information. This permits various performance improvements to be made, such as allow a quorum determination to be made without necessarily having to communicate with a database node outside of the preferred availability zone.

The durability of a zonal version of a distributed database—one that concentrates replicas within a preferred availability zone—is less than a corresponding non-zonal version, but provides benefits for writes which may include significant reductions in latency. In addition to potentially improving the performance of quorum determinations, performance may also be improved by serving streams or transactions from the preferred availability zone. Another performance improvement that may be achieved involves indexes of the data, which may be kept within the preferred availability zone to allowing writes to an index to propagate more quickly than they would if the index were located in a different availability zone.

A service associated with the distributed database may be placed within the preferred zone in order to improve the efficiency of the service and the distributed database. For example, a streaming service, indexing service, application or business logic implementation, or other compute service may be placed within the preferred zone. In at least one embodiment, a control plane or other component of the distributed database, or more generally a control plane of a hosted compute platform, may determine, based on the designation of an availability zone as a preferred availability zone, to place or concentrated placement of a compute service in the preferred zone. For example, in at least one embodiment, a streaming service provides a time-ordered sequence of events related to the operation of a distributed database, in order to allow a client of the service to receive notification of these events and respond to them. Application logic, implemented for example as a "serverless" compute function, might be configured to receive and respond to these events. In response to the designation of an availability zone as preferred, a control plane associated with the system might concentrate resources for implementing the stream and/or the application logic within the preferred zone.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. In at least one embodiment, update performance of a distributed database is improved by using techniques related to a preferred availability zone, as descried herein. In at least one embodiment, using said techniques, a distributed database system is enabled to provide improved replication performance. Additional benefits of various embodiments are also described herein.

FIG. 1 illustrates an example of a distributed database system 100 with an availability zone designated as preferred, according to at least one embodiment. In FIG. 1, an example distributed database system 100 comprises database nodes 120-128 distributed across availability zones 102-106.

In at least one embodiment, an availability zone, such as any one of the availability zones 102-16 depicted in FIG. 1, comprises hardware to provide compute capacity that is separate from other availability zones, so that a failure in one zone is unlikely to effect the operation of other availability zones. For example, in at least one embodiment, an availability zone comprises a data center whose geographic location is distinct from other availability zones, and that has power supply and networking capability that is independent from other zones, so that a widespread failure in one availability zone (such as a complete interruption of power to that zone's data center) is highly unlikely to interrupt the operation of other zones. Computing hardware in a given availability zone is able to communicate, via additional network hardware, with computing hardware in other zones. However, communication latency between availability zones may be relatively high compared to intra-zone communication latency.

In at least one embodiment, a database node, such as any one of the depicted database nodes 120-128, is a component of a distributed database that manages at least a subset of all of the data maintained by the distributed database. A database node may, for example, manage a table, a replica of a table, a partition of a table, or a replica of a partition.

In at least one embodiment, a table is a collection of data. For example, in at least one embodiment, a table corresponds to a collection of data items indexed by one or more keys. The keys are sometimes referred to as names. The data items may include scalar values, collections of scalar and non-scalar values, and documents. In another example, in at least one embodiment, a table is a relational-defined collection of data having a structure defined in terms of rows and columns. A table may also be a semi-structured collections of data, such as extended query language ("XML") documents, wide-column tables, graphs, and so on.

In at least one embodiment, a replica is a copy of a table or table partition, or of a portion thereof. These copies are kept in sync, in various embodiments, in a process sometimes referred to as replication. For example, updates made to a table on one database node can be propagated and applied to replicas on other database nodes. In at least one embodiment, this is done by propagating transaction log information from one database node to another. In at least one embodiment, a replication component 130 facilitates replication.

In at least one embodiment, a partition is a subdivision of a table. For example, a collection of key-value data may be split my mapping hashes of a key to "buckets" that correspond to partitions. Regarding relational and semi-relational tables, a table may be split horizontally, so that some portion of rows are contained in one partition and some other portion of rows in another partition, or vertically, so that the table is split by column. Various other partitioning methods may also be used.

In at least one embodiment, updates to the collection of data maintained by distributed database 100 is managed according to a quorum requirement. A quorum requirement is sometimes referred to as a quorum policy. This refers, in at least one embodiment, to a policy that changes to a table made on one database node must be replicated to one or more other database nodes before the update is considered complete. The number of other database nodes may, in some instances, be at least one other database node, or a majority of database nodes in the system. Implementation of a quorum requirement may, in some instances, be reflected by implementation of a consistency policy for read operations, in which a request to read data from an updated table does not reflect the update until at least a quorum number of database nodes have applied the update to their respective replicas.

An availability zone may comprise a control plane 110 and request router 112. A control plane 110, in at least one embodiment, comprises hardware and software to facilitate the operation of database nodes in a respective availability zone. For example, as depicted in FIG. 1, an availability zone 104 comprises control plane 110b, request router 112b, and database nodes 122-126. The control plane 110b, in at least one embodiment, performs or causes to be performed operations to configure database nodes 122-126 and request router 112b in its availability zone 104. The control plane 110b in this zone may also, in at least one embodiment, interact with control planes in other nodes. This could be done, for example, to facilitate move a table between database nodes in different zones.

A request router 112, in at least one embodiment, is included in some embodiments to route database requests to an appropriate database node. For example, with respect to FIG. 1, a request router 112b in availability zone 104 might route requests to any one of the database nodes within its own availability zone 104, or to database nodes in other zones 102, 106.

In the example 100 of FIG. 1, replicas of a table 140a-c are presumed, for the sake of the example, to be initially located at in separate availability zones 102-106. Alternatively, a default configuration for a new table may be to place one of the replicas 140a-c in each of the availability zones 102-106. In either case, the example 100 of FIG. 1 depicts that table replicas 140a,c in zones 102, 106, are relocated (or initially placed) in one availability zone 104.

In at least one embodiment, multiple replicas are placed within a selected availability zone 104 based, at least partially, on a determination that the selected zone should be designated as preferred for replica placement.

In at least one embodiment, multiple replicas are placed within a selected availability zone 104 based, at least partially, on input provided from a client. For example, an administrative user of distributed database 100 may, based on factors such as anticipated usage patterns, determine that the database's usage patterns may be tilted towards a particular zone, and indicate that this zone should be designated as preferred. In some embodiments, the administrative user might interact with a user interface to designate the preferred zone. In some instances, the user interface might contain elements allowing the user to indicate various parameters related to durability and availability. For example, a parameter might be used to indicate an availability level that is considered acceptable, or likewise a parameter to indicate acceptable durability levels. Higher availability can be provided by greater distribution of database nodes across availability zones, and higher durability can be provided by more stringent quorum requirements. However, if lower levels of availability or durability are indicated as permissible, the system 100 may determine to relocate certain tables to nodes within the same availability zone, in order to improve performance.

In at least one embodiment, multiple replicas are placed within a selected availability zone 104 based, at least partially, on analysis of data stored, or to be stored, in a table. Certain types of tables, such as those that store time series, may have insert or update patterns which allow network traffic to be predicted. For example, regarding a time series, new data is often inserted more frequently than older data. If a table is partitioned, replicas of the newest partition may be used more often than replicas of older partitions. The system might therefore determine to designate a certain availability zone for the newer partitions.

In at least one embodiment, multiple replicas are placed within a selected availability zone 104 based, at least partially, on network analysis. For example, network traffic in a distributed database may comprise read and write requests originating from outside any of the availability zones 102-106, read and write requests originating from with the availability zones 102-106, traffic related to confirming quorum, and replication traffic between zones 102-106. The placement of tables between the various zones may have significant impact on this traffic. For example, if table replicas 140a-c are all placed within the same availability zone 104, replication traffic between those tables will all be intra-zonal. On the other hand, if the table replicas 140a-c are each placed in a separate zone, then replication traffic will be inter-zonal. Traffic related to quorum decisions may follow a similar pattern. For read and write requests, it may be necessary to forward the requests between zones, depending on placement of the replicas. Accordingly, analysis of this traffic may be done to determine if system performance could be improved by placing more than one replica with a designated zone of availability 104, rather than conventionally distributing the replicas among multiple availability zones 102-106.

Figure 2:
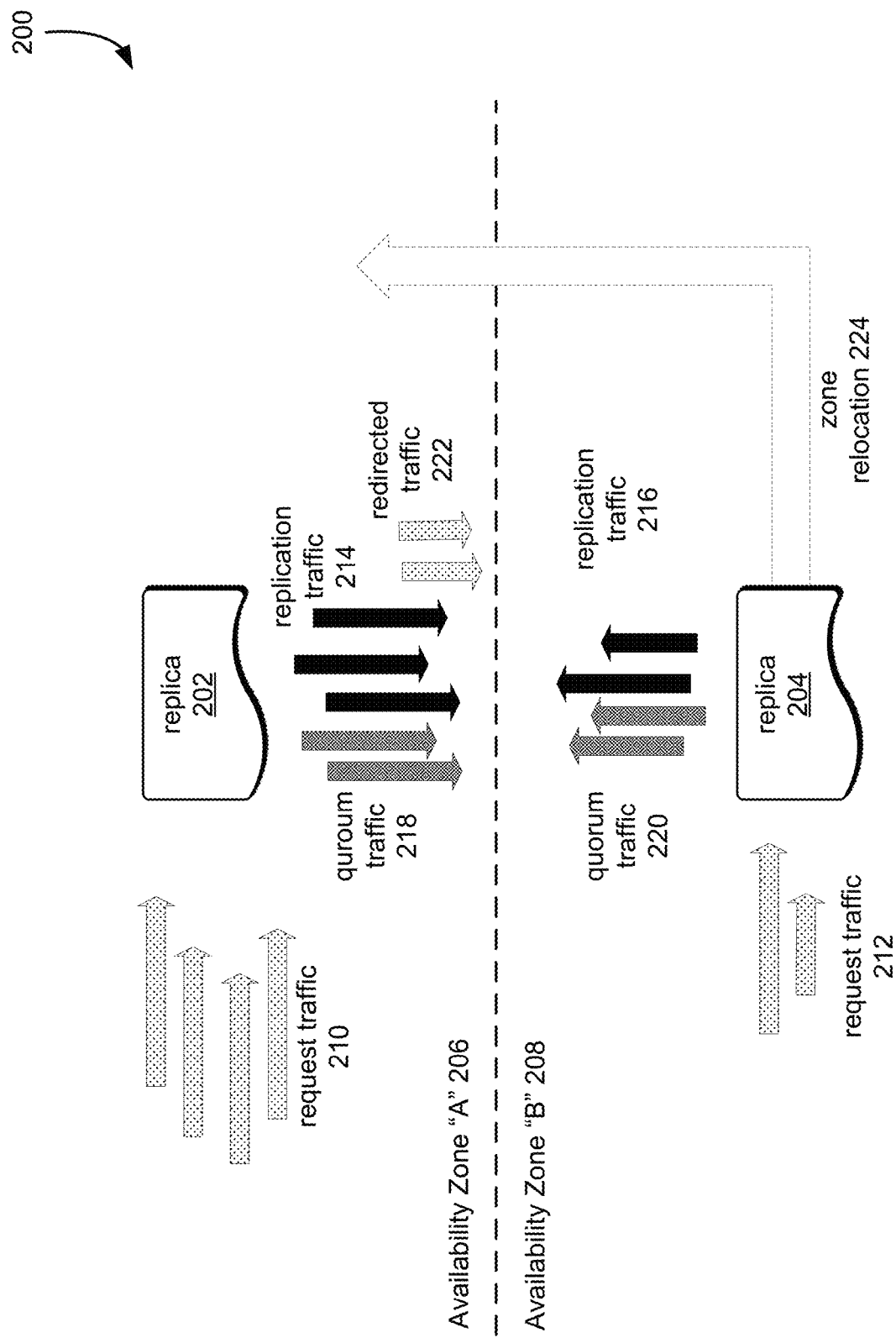
FIG. 2 illustrates an example of relocation of a table to a preferred availability zone, according to at least one embodiment.

FIG. 2 illustrates an example 200 of relocation of a table to a preferred availability zone, according to at least one embodiment. In particular, the example 200 of FIG. 2 illustrates relocation of a replica based on network traffic analysis. However, various aspects and principles of replica relocation, as discussed regarding FIG. 2, may be applied to other basis for designating an availability zone as preferred for a table replica or partition replica.

In the example 200 of FIG. 2, a first replica 202 is located in availability zone "A" 206 and a second replica 204 is located in availability zone "B" 208. These replicas and availability zones may correspond to some of those depicted in FIG. 1. The replicas 202, 204 may, for example, be replicas of a table or a partition of a table managed by the distributed database system 100 depicted by FIG. 1. For the purposes of the example 200, these replicas 202, 204 are considered to be synchronized or replicated copies of the same table or partition.

A variety of network traffic may be associated with maintaining a partition on a database node. FIG. 2 depicts certain examples of such traffic. However, it will be appreciated that the examples are intended to be illustrative, and as such the examples provided should not be construed in a manner which would limit the scope of potential embodiments to only those that include the specific examples provided.

In at least one embodiment, request traffic 210, 212 comprises traffic related to accessing or updating data maintained in the replicas 202, 204. This traffic can include requests to read data, requests to insert data, and requests write or update data. Such traffic may be directed initially to a certain availability zone. This is depicted in FIG. 2 by request traffic 210 being directed to replica 202 in availability zone "A" 206, and request traffic 212 being directed to replica 204 availability zone "B" 208. Note that here, traffic directed to a given replica is generally sent and processed by the database node on which the replica is maintained. This is described, for the sake of brevity, as being directed to a replica.

In some cases, request traffic directed at a particular replica may be misdirected, and as such may be forwarded to a replica in a different availability zone. In FIG. 2, this is depicted by redirected traffic 222 being sent from availability zone "A" 206 to availability zone "B" 208. In at least one embodiment, a request router, such as any one of those depicted in FIG. 1, redirects misdirected traffic. Note that in some cases, requests to read data from one replica may result in additional traffic being sent to replicas or other tables in other zones.

In at least one embodiment, quorum traffic 218, 220 comprises traffic involving confirmation of quorum. As explained herein, a distributed database may impose certain requirements for treating changes to data as durable, such as requiring a plurality or majority of database nodes to have processed a change before the change can be treated as finalized. Replicas may therefore send requests to other nodes to determine if a change has been properly replicated. Relatedly, replication traffic 214, 216 can be sent between replicas.

In at least one embodiment, analysis of network traffic related to these and other functions may determine that performance could be improved by relocated the replica to a different zone. In at least some cases, relocating a replica, depicted by element 224 in FIG. 2, involves moving the replica to the same zone as another replica of the same table or partition. In other cases, a replica may be moved to a zone that has less latency with respect to a significant portion of the analyzed traffic.

In at least one embodiment, network traffic, such as the traffic 210-222 that is depicted in FIG. 2, is analyzed for periodic variations, such as those in which peaks occur daily or seasonally. In at least one embodiment, a replica is temporarily relocated to improve performance during such peaks.

In at least one embodiment, replica relocation is done in view of durability and availability parameters. For example, in at least one embodiment, a replica is moved based on an analysis that takes into account both network traffic and availability parameters. In some cases, it may be permissible to relocate a replica so that it shares a zone with another replica of the same table, because for the particular application involved performance considerations may outweigh the increased availability guarantees that zonal separation can provide. In other cases, replica relocation may not be possible, because high availability is prioritized over performance.

Figure 3:
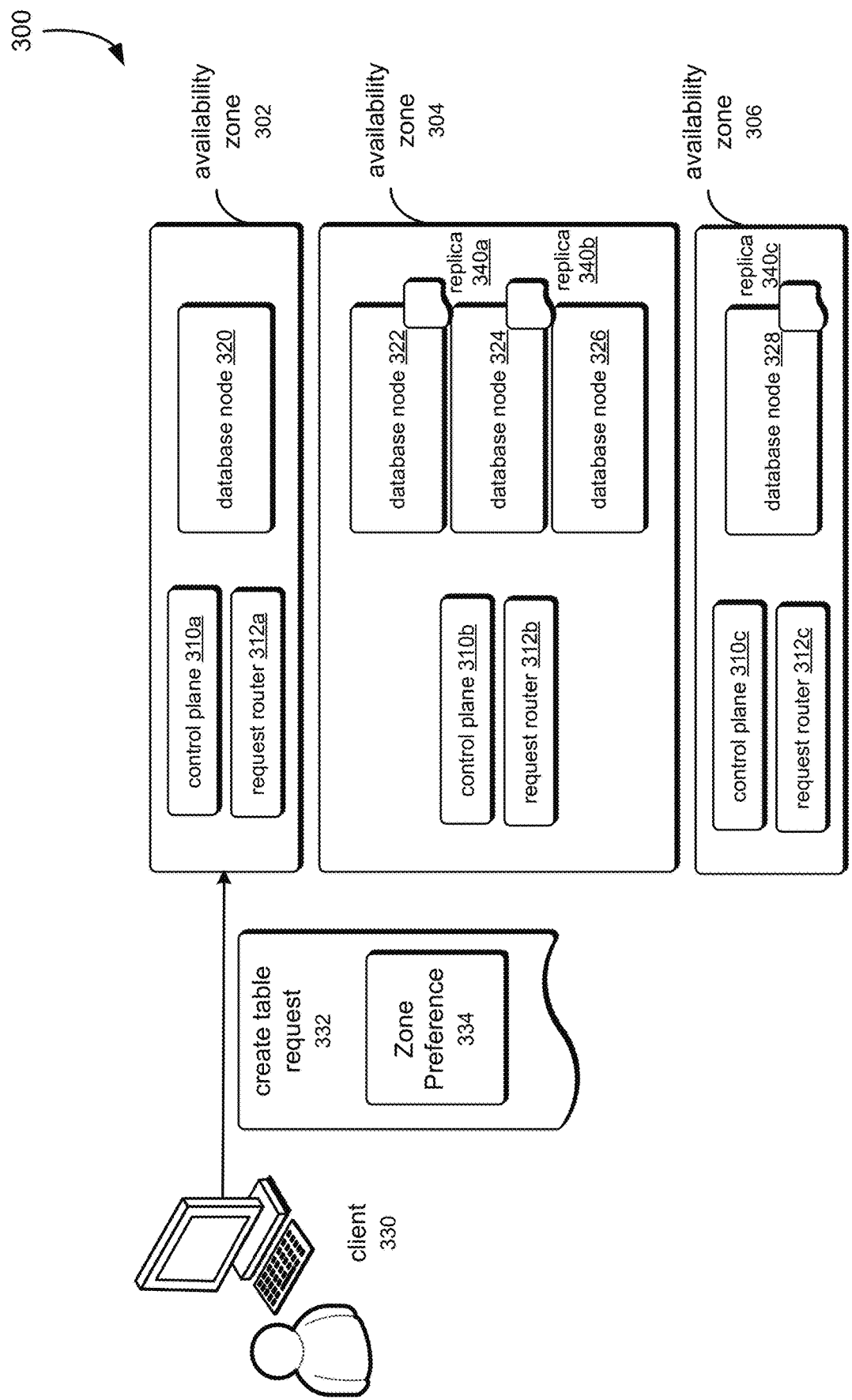
FIG. 3 illustrates an example of creating a table based on an availability zone indicated as preferred, according to at least one embodiment.

FIG. 3 illustrates an example 300 of creating a table based on an availability zone designated as preferred, according to at least one embodiment. In the example 300 of FIG. 3, a distributed database system, corresponding to the system 100 depicted in FIG. 1, includes availability zones 302-306. Within the zones 302-306 are database nodes 320-328. Each zone also includes a control plane 310 and request router 312.

A client 330 may cause a create table request 332 to be sent to the distributed database. The request may be initially received within a first availability zone 302. A create table request 332, in at least one embodiment, comprises data indicating that the distributed database system should create a table. The create table request 332 may comprise a definition of the requested table, which can include a name of the table, a key specification, data type indicators, and so forth.

In at least one embodiment, a control plane 310a within the first availability zone 302 receives the create table request 332, and determines that it contains a zone preference indicator 334. In at least one embodiment, the zone preference indicator indicates that replicas may be grouped within an availability zone, and indicates one or more zones in which such grouping may occur. In at least one embodiment, an automatic configuration mode is enabled, in which parameters for durability, availability, and/or performance are indicated in the create table request, and subsequently used to determine a strategy, consistent with the supplied parameters, for permitting grouping of replicas within one or more zones.

In the example 300 of FIG. 3, it may be assumed, for the sake of the example, that zone preference indicator designates a second availability zone 304 as the preferred availability zone. The client 330 may, for example, have determined that this zone 304 is expected to directly receive the most traffic. In at least one embodiment, the distributed database system facilitates such determinations by providing data to indicate which zones have, or are expected to have, the greatest traffic.

In at least one embodiment, the distributed database system responds to the designation of the preferred availability zone 304 by identifying additional database nodes within that zone that are capable of maintaining replicas. For example, the system might determine that database two database nodes 322, 324 are available in that zone to host two replicas 340a,b. Alternatively, the system might determine to initialize database nodes 322, 324 and assign to them the task of hosting the replicas 340a,b. In at least one embodiment, control plane 310b manages operations to identify, initialize, and/or allocate database nodes, so that they may host a corresponding replica. The control plane 310b may, for example, be capable of executing workflows that allocate computing capacity, initialize a virtual machine, start a database instance, and execute commands for creating a replica.

In at least one embodiment, the operation of a request router, such as the request routers 312a-c, is modified based on the designation of the second availability zone 304 as the preferred availability zone. The request routers 312a-c may, for example, favor database nodes in the second availability zone 304 for processing request. This might even be the case, in some circumstances, for zones that have a database node that host the replica. This approach may be beneficial in that the overall benefit to the system—such as in decreased time to achieve quorum and reduced network traffic—may outweigh the cost of forwarding the request to the preferred zone.

In at least one embodiment, some replicas are maintained outside the preferred availability zone 304. For example, although a majority of nodes might be placed in the preferred second availability zone 304, an additional replica might be placed in a third availability zone 306. Doing so may increase the system's overall availability characteristics, since the system remains at least somewhat protected from a sudden failure of the preferred zone. Note that availability zones may be ranked in order of preferability, so that the majority of replicas are assigned to the highest-ranked zone, and fewer replicas to a less highly ranked zone, and perhaps no replicas to lowest ranked, or unranked, zones.

In at least one embodiment, the designation of a preferred availability zone can be changed subsequent to an initial designation. For example, a command to alter an existing table might be sent by an administrative client of the distributed database, and this command might include parameters indicating that the preferred availability zone should be changed. This could include explicit designation of a new availability zone, or modification of parameters which might then result in the preferred zone being changed.

Figure 4:
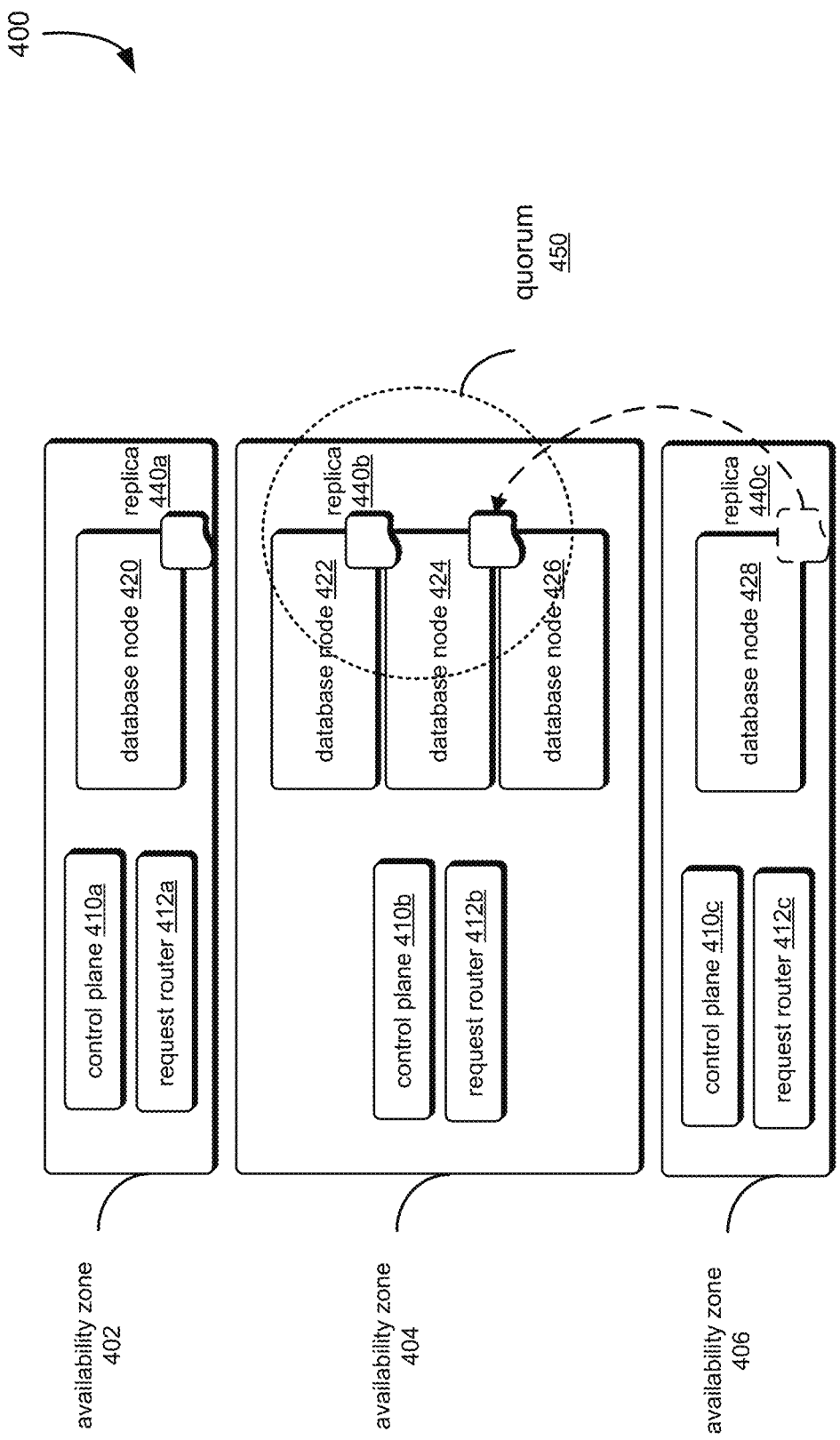
FIG. 4 illustrates an example of distribution of replicas in a distributed database system according to an availability zone designated as preferred and additional parameters indicative of durability and availability, according to at least one embodiment.

FIG. 4 illustrates an example 400 of distribution of replicas in a distributed database system according to an availability zone designated as preferred and additional parameters indicative of durability and availability, according to at least one embodiment. In the example 400 of FIG. 4, a distributed database system, corresponding to the distributed database system 100 depicted in FIG. 1, includes availability zones 402-406. Within the zones 402-406 are database nodes 420-428. Each zone also includes a control plane 410 and request router 412.

In the example 400, it may be presumed, for the purposes of the example, that a second availability zone 404 has been designated as preferred. The distributed database system may therefore, at some time, determine to change a default distribution of replicas 440a-c, in which one replica is placed in each availability zone 402-406, to an alternate configuration in which two or more replicas are placed in the preferred availability zone 404.

In at least one embodiment, if an availability parameter is set to at least a threshold level, the system determines to leave at least one replica outside of the preferred availability zone. If the availability parameter is set to a maximum level, at least one replica is kept in each availability zone. In the example 400 of FIG. 4, it may be assumed, for the purpose of the example, that an availability parameter was set above the threshold level but below maximum, allowing a replica 440c to be moved from the third availability zone 406 to the preferred availability zone 404, while also indicating that at least one replica 440a should be left in an availability zone 402 other than the preferred availability zone 404.

In at least one embodiment, durability parameters relates to factors such as a number of nodes required to achieve quorum, or indicators related to performance characteristics related to achieving quorum. These characteristics may indicate an amount of time in which quorum 450 could typically be achieved. If set to a relatively low amount of time, a number of nodes sufficient to constitute quorum may be placed in the preferred availability zone 404. Note that in some cases these parameters may be set on a per-zone basis. For example, a zone marked as a preferred zone may have one set of such parameters, and zones not marked as preferred may have another, to accommodate the potential need to contact database nodes in other zones to achieve quorum.

Figure 5:
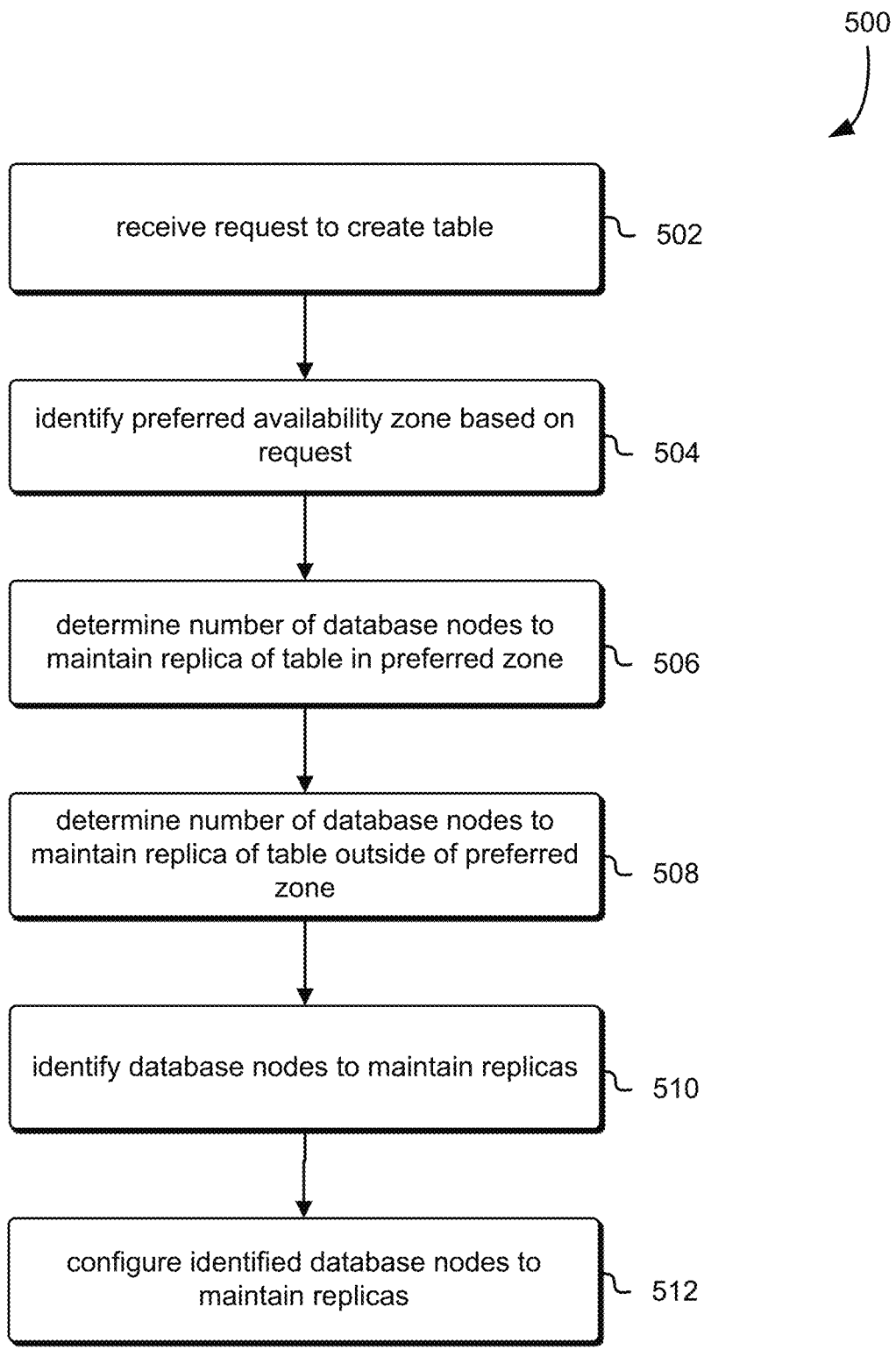
FIG. 5 illustrates an example of a process for maintaining a database table based, at least in part, on a client-provided designation of a preferred availability zone, according to at least one embodiment.

FIG. 5 illustrates an example of a process 500 for maintaining a database table based, at least in part, on a client-provided designation of a preferred availability zone, according to at least one embodiment.

Although the example process 500 depicted in FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The operations depicted by FIG. 5 may be performed by a distributed database system, such as the distributed database system 100 depicted in FIG. 1. In an embodiment, the operations depicted by FIG. 5 are performed, except where otherwise noted, by control plane component of a distributed database, such as any of the control planes depicted in FIG. 1. In some instances, a as explained in more detail below, a control plane causes actions to be performed by a database node, such as any of the database nodes depicted in FIG. 1.

At 502, the distributed database system receives a request to create a table. To ensure certain levels of durability and availability, the distributed database system may store a number of replicas of the table on separate nodes of the distributed database. Absent any indication that a particular availability zone should be preferred, the replicas are typically placed on separate database nodes located in separate availability zones. For example, a replica of the table might be stored on a database node in each of three availability zones, so that there are three separate database nodes that store the table. In the operation of one of the availability zones is interrupted, the two database nodes in the two other availability zones can continue to operate. The availability of the system is therefore preserved. However, as described herein, there may be circumstances in which it is beneficial for the system to concentrate replicas in a preferred availability zone, even if the risk of losing availability is increased.

In at least one embodiment, the distributed database system comprises a plurality of such database nodes located in a plurality of availability zones. At least some tables managed by the distributed database are stored as at least three replicas in at least three availability zones. The distributed database may receive a request to store a database table, and obtains information that designates one of the availability zones as preferred.

In at least one embodiment, an availability zone is designated as preferred via a user interface. For example, a user interface may be provided to facilitate management of a distributed database system. The user interface may comprise an element that allows the selection of a preferred availability zone. The element could, for example, be a drop-down list, checkbox, radio button, or other element that could be used to indicate which availability zone, if any, should be designated as preferred. It will be appreciated that these examples are intended to be illustrative, and as such the examples provided should not be construed in a manner which would limit the scope of potential embodiments to only those that include the specific examples provided.

In at least one embodiment, an availability zone is designated as preferred via user interface elements which allow the selection of parameters that indicate acceptable levels of tolerance for availability interruptions, or which indicate a degree to which performance should be weighted over other concerns. For example, in at least one embodiment, a user interface element might permit the user to select a checkbox which indicates that the system should be able to automatically designate an availability zone as preferred. In another example, a user interface might include a slider control which indicates the degree to which performance is preferred over other considerations, such as availability. It will be appreciated that these examples are intended to be illustrative, and as such the examples provided should not be construed in a manner which would limit the scope of potential embodiments to only those that include the specific examples provided.

At 504, the distributed database system identifies a preferred availability zone based on the request. This may be done, for example, by accessing information obtained from a user interface such as the one just described. Alternatively, the request itself may contain information designated a preferred availability zone. In at least one embodiment, a textual command such as "create table" is sent, along with various textual parameters such as the name of the table, a key specification, and so forth. This command might also include a parameter which either explicitly designates a preferred availability zone, or which includes parameters that indicate acceptable levels of tolerance for availability interruptions, or which indicate a degree to which performance should be weighted over other concerns.

In at least one embodiment, a command to create a table does not explicit designate a preferred availability zone, but instead includes parameters to indicate that the distributed database system may automatically designate a zone as preferred. For example, in at least one embodiment, a system determines to designate an availability zone as a preferred availability zone based, at least partially, on network traffic that is sent to that zone. This may be done internally or externally to the distributed database management system. Information designating the zone as preferred can then be provided to a component within the distributed database management system, such as the control plane, to act upon.

In at least one embodiment, once it has been determined that an availability zone has been or should be designated as preferred, and that zone has been identified, the system may proceed to determine a distribution of replicas across the system's availability zones.

At 506, the distributed database system determines a number of database nodes to maintain a replica of a table, or a replica of a partition of a table, in a preferred availability zone. In at least one embodiment, this quantity is at least a number of nodes sufficient for making a quorum determination. Doing so may reduce inter-zonal traffic as well as reduce the amount of time necessary to achieve quorum for an update.

At 508, the distributed database system determines a number of database nodes to maintain a replica of a table, or a replica of a partition of a table, outside of a preferred zone. Concentrating replicas within a single availability zone may provide greater improvements to efficiency and performance, but at the same time reduce the availability of the system over time. In at least one embodiment, parameters indicating tolerance for availability interruptions are used to calculate a number of database nodes to maintain outside of the preferred zone. The number of replicas to place outside of the preferred zone can therefore be based on a parameter that indicates the amount of tolerance for reduced availability.

At 510, the distributed database system identifies database nodes that are to maintain the replicas. This may be done, for example, via control planes in the various availability zones. In some instances, database nodes may already be installed and ready to use to store a replica. In other instances, one or more database nodes may need to be instantiated.

At 512, the distributed database system configures the identified database nodes to maintain the replicas. The replicas can be stored on the database nodes, once the requisite nodes have been identified and prepared for storing the replicas. In at least one embodiment, this is done via the control planes.

In at least one embodiment, all of the replicas for a given collection of data, such as a table, are stored in the preferred availability zone. For example, in at least one embodiment, the system causes a quantity of database nodes in the preferred availability zone to store replicas of the database table, where the quantity of database nodes is sufficient for making quorum determinations.

In another embodiment, the replicas are stored in the determined number within the preferred availability zone, and some number of additional replicas are stored in database nodes outside of the preferred availability zone.

In at least one embodiment, the system configures its components to take advantage of the designation of the preferred availability zone and the placement of additional replicas within it. In at least one embodiment, the system configures a database node in the preferred availability zone to attempt to make quorum determinations using other database nodes also in the preferred availability zone. This is done prior to attempting to make quorum determinations using database nodes not in the preferred zone. For example, if two of three replicas of a collection of data are located in a preferred zone, and one replica is outside of it, the leader node can attempt to confirm quorum by first contacting the other node within the preferred zone.

Quorum can then be confirmed without needed to communicate with a node outside of the preferred zone. If this database node is unable to confirm quorum, the leader can then check with the database node outside of the preferred zone.

In at least one embodiment, network traffic is directed to or forwarded to the preferred availability zone. For example, in at least one embodiment, client applications may be instructed to send requests to access or update data to the preferred zone. This might be done, for example, by a communication sent from the distributed database to the client upon the establishment of a connection.

In another example, network traffic is forwarded from an availability zone outside of the preferred zone to the preferred zone. This might include, for example, a request to update a collection of data. The net computational cost of forwarding the request to the preferred zone might be less, in such cases, than the computational cost of processing the update locally. In at least one embodiment, a request router or other component forwards requests in this manner, based on stored information indicating that an availability zone has been designated as the preferred availability zone.

Figure 6:
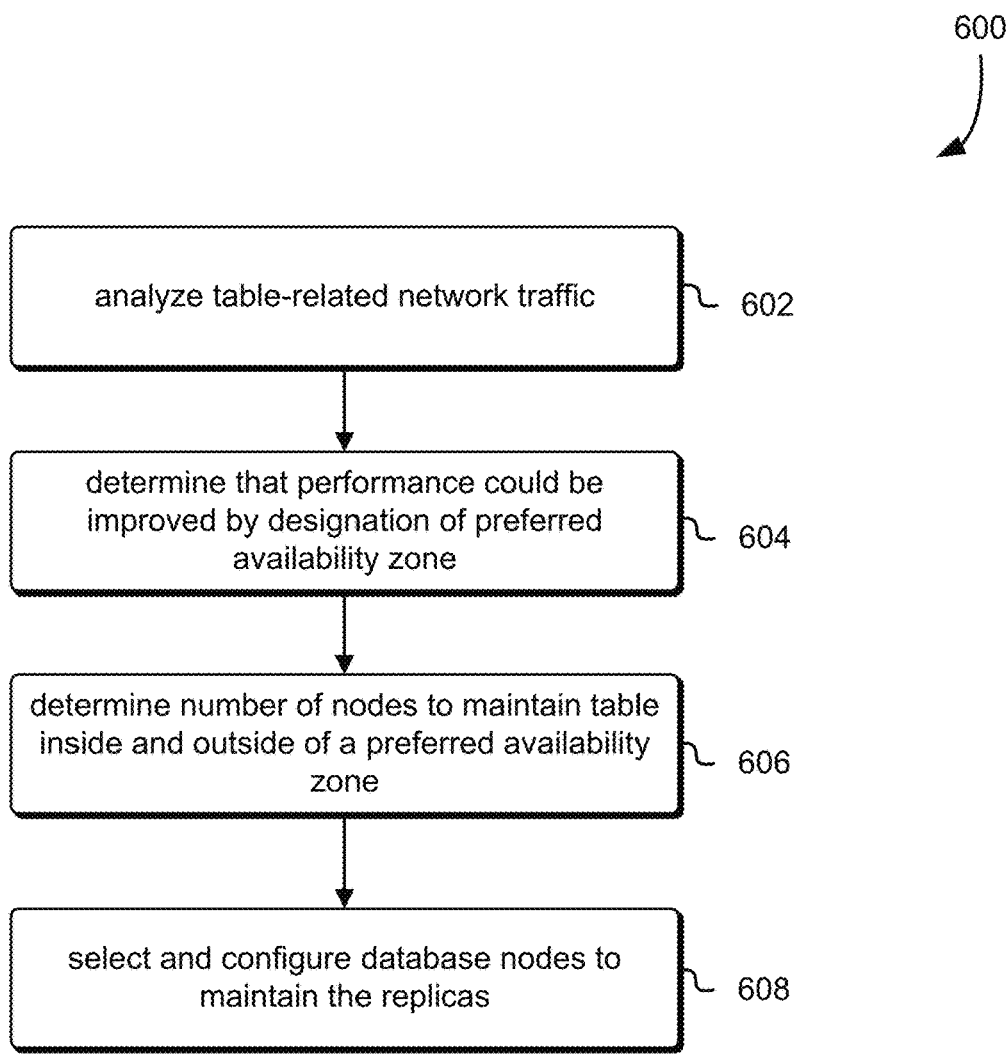
FIG. 6 illustrates an example of a process for maintaining a distributed database based, at least in part, on an availability zone identified as preferred based on network traffic analysis, according to at least one embodiment.

FIG. 6 illustrates an example of a process 600 for maintaining a distributed database based, at least in part, on an availability zone identified as preferred based on network traffic analysis, according to at least one embodiment.

Although the example process 600 depicted in FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The operations depicted by FIG. 6 may be performed by a distributed database system, such as the distributed database system 100 depicted in FIG. 1. In an embodiment, the operations depicted by FIG. 6 are performed, except where otherwise noted, by control plane component of a distributed database, such as any of the control planes depicted in FIG. 1. In some instances, a as explained in more detail below, a control plane causes actions to be performed by a database node, such as any of the database nodes depicted in FIG. 1.

At 602, a system analyzes table-related network traffic. In at least one embodiment, this includes traffic directly and indirectly related to the maintenance of a collection of data, such as a table or a partition of a table. The traffic can therefore include requests to access data in the collection of data, requests to update the collection of data, requests to add data to the collection of data, and requests to delete data from the collection of data. It can also include related network traffic, such as messages associated with confirming quorum, messages sent to replicate data between database nodes, and so on. In at least one embodiment, network traffic is analyzed in terms of a number of operations performed on a table by a database node, instead of or in addition to analyzing network traffic directly. However, in other instances, analysis of the network traffic is performed by techniques such as packet inspection. In general, any technique providing insight to network traffic related to a particular table may be employed.

At 604, a system determines that performance of the distributed database may be improved by the designation of an availability zone as preferred. In some instances, the determination is based, at least partially, on whether traffic related to a table is concentrated in a particular zone. If so, there may be a benefit to designating that zone as preferred.

At 606, the distributed database system determines a number of nodes, inside and outside of the preferred availability zone, to maintain replicas of the table. While there may be a benefit to concentrating replicas within the preferred zone, there may also be drawbacks, particularly relating to a decrease in availability. The availability of a system may, in at least one embodiment, be quantified in terms such as a percentage of time at the table is expected to be available, or as a probability, per unit of time, that the table may become unavailable. Availability parameters may define tolerance to a reduction in availability, which may be quantified as a minimum percentage of time the table is expected to be available, or as a maximum probability, per unit time, of that the table may be unavailable. Other indications of tolerance may also be used, as provided in various examples herein. These indications may be referred to as tolerance parameters.

In at least one embodiment, the distributed database system determines the number of nodes that will maintain replicas of the table in each of the respective availability zones. This may be described as generating a distribution of replicas across the availability zones. In at least one embodiment, the distribution is based, at least in part, on balancing availability parameters with performance parameters, so that a sufficient concentration of replicas is placed in the preferred zone to conform with the performance parameters, and sufficient replicas are located in other availability zones to conform with availability parameters.

At 608, the distributed database system selects and configures database nodes to maintain the replicas. As described herein, this may be done, in various embodiments, by workflows executed primarily by control plane components of the distributed database system. When complete, the replicas are maintained by a plurality of database nodes in the preferred availability zone and, if required to conform with availability parameters, on database nodes located in other availability zones.

Figure 7:
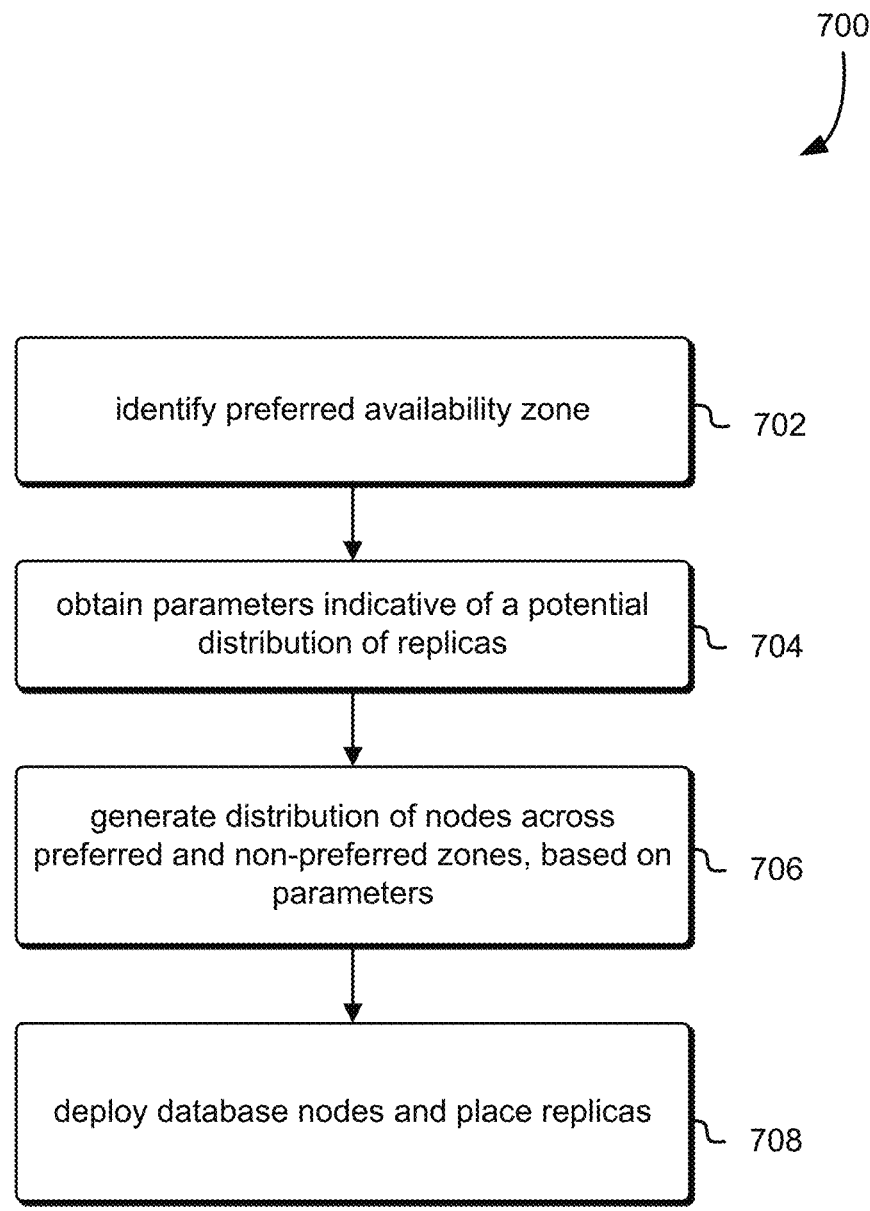
FIG. 7 illustrates an example of a process for maintaining a distributed database based, at least in part, on a preferred availability zone and parameters indicative of a potential distribution of replicas, according to at least one embodiment.

FIG. 7 illustrates an example of a process 700 for maintaining a distributed database based, at least in part, on a preferred availability zone and parameters indicative of a potential distribution of replicas, according to at least one embodiment.

Although the example process 700 depicted in FIG. 7 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The operations depicted by FIG. 7 may be performed by a distributed database system, such as the distributed database system 100 depicted in FIG. 1. In an embodiment, the operations depicted by FIG. 7 are performed, except where otherwise noted, by control plane component of a distributed database, such as any of the control planes depicted in FIG. 1. In some instances, a as explained in more detail below, a control plane causes actions to be performed by a database node, such as any of the database nodes depicted in FIG. 1.

At 702, the system identifies a preferred availability zone. As described herein, the designation may be obtained using various techniques, including but not limited to obtaining a designation from a user, and obtaining a designation based on analyzing network traffic or other usage patterns.

At 704, the system obtains parameters indicative of a potential distribution of replicas. While there may be a benefit to concentrating replicas within the preferred zone, there may also be drawbacks, particularly relating to a decrease in availability. The distributed database system, or a related system, may determine the number of nodes that will maintain replicas of the table in each of the respective availability zones. This may be described as generating 706 a distribution of nodes and replicas across the availability zones. In at least one embodiment, the distribution is based, at least in part, on balancing availability parameters with performance parameters, so that a sufficient concentration of replicas is placed in the preferred zone to conform with the performance parameters, and sufficient replicas are located in other availability zones to conform with availability parameters. Additional parameters, such as those related to durability and consistency, may also be factored into the generation of the distribution.

The availability of a system may, in at least one embodiment, be quantified in terms such as a percentage of time at the table is expected to be available, or as a probability, per unit of time, that the table may become unavailable. Availability parameters may define tolerance to availability interruptions, which may be quantified (for example) as a minimum percentage of time the table is expected to be available, or as a maximum probability, per unit time, of that the table may be unavailable. Other parameters may also be used to indicate tolerance to availability interruptions, including but not necessarily limited to indications that performance is to be favored over availability.

At 708, the system deploys database nodes and places the replicas. As described herein, this may be done, in various embodiments, by workflows executed primarily by control plane components of the distributed database system. When complete, the replicas are maintained by a plurality of database nodes in the preferred availability zone and, if required to conform with availability parameters, on database nodes located in other availability zones.

Figure 8:
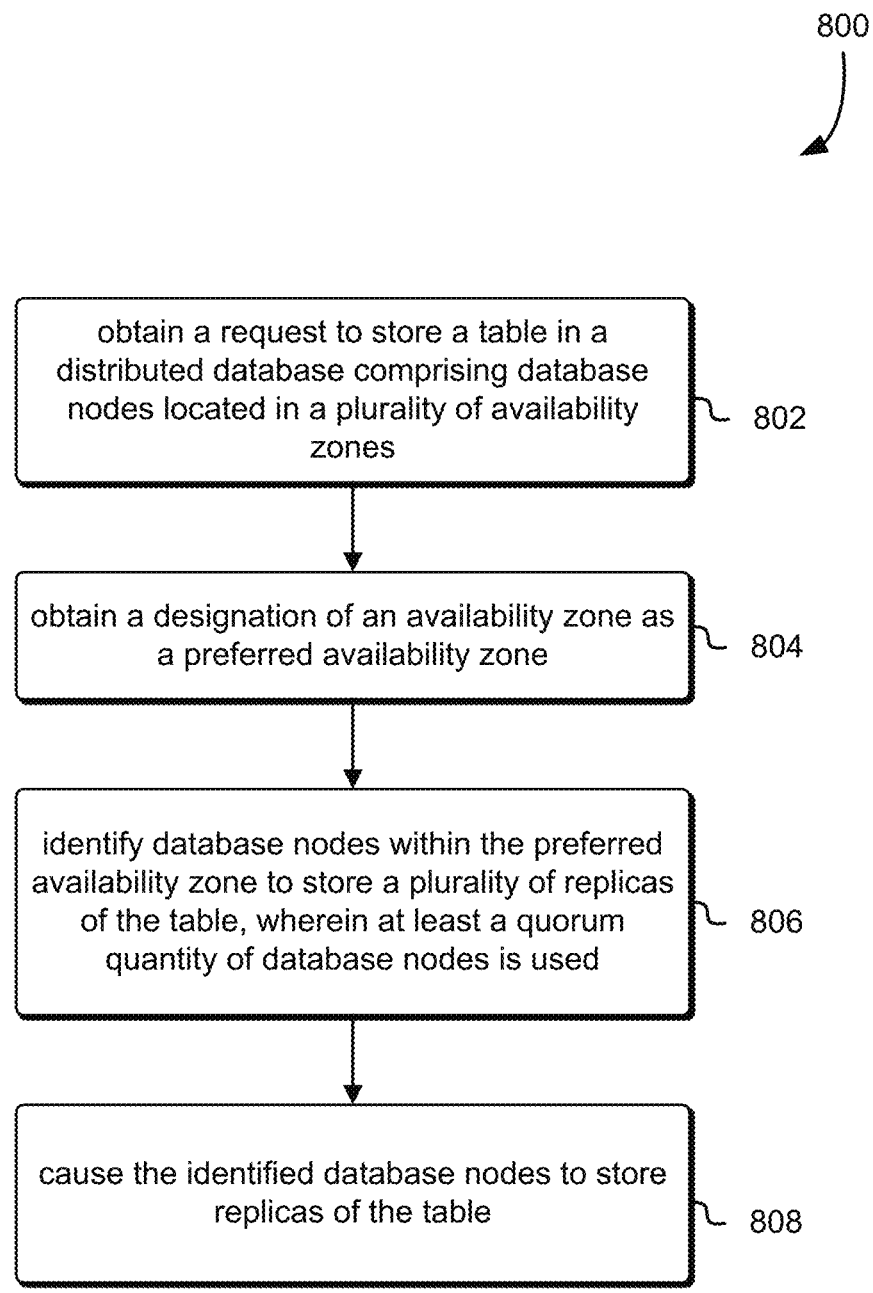
FIG. 8 illustrates an example of a process for maintaining a collection of data in a distributed database with an availability zone designated as preferred, according to at least one embodiment.

FIG. 8 illustrates an example of a process 800 for maintaining a collection of data in a distributed database with an availability zone designated as preferred, according to at least one embodiment.

Although the example process 800 depicted in FIG. 8 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The operations depicted by FIG. 8 may be performed by a distributed database system, such as the distributed database system 100 depicted in FIG. 1. In an embodiment, the operations depicted by FIG. 8 are performed, except where otherwise noted, by control plane component of a distributed database, such as any of the control planes depicted in FIG. 1. In some instances, a as explained in more detail below, a control plane causes actions to be performed by a database node, such as any of the database nodes depicted in FIG. 1.

At 802, the distributed database system obtains a request to store a table, or other collection of data, in a distributed database system that comprises a plurality of database nodes located in a plurality of availability zones.

At 804, the distributed database system obtains a designation of an availability zone as a preferred availability zone. This may be done, for example, using any of the techniques described herein, including but not limited to selection by a user, network traffic analysis, and so forth.

At 806, the distributed database system identifies database nodes within the preferred availability zone, to store on those nodes a plurality of replicas of the table. At least a quorum quantity of nodes are used, to store a quorum quantity of replicas.

At 808 the distributed database system causes the identified database nodes to store a replica of the table, so that one replica is stored and subsequently maintained by each database node.

In some cases and embodiments, additional replicas may be stored outside of the preferred availability zone. This may be done, for example, to conform with availability parameters. Accordingly, replicas may be placed inside and outside of the preferred availability zone (or preferred zones, if more than one is used) according to some intended distribution of replicas inside and outside of the preferred zone(s).

In at least one embodiment, a component of a distributed database management system includes at least one processor and at least one memory that stores computer-executable instructions that, in response to being executed by the at least one processor, cause the system to at least obtain a request to store a database table in a distributed database comprising a plurality of database nodes located in a plurality of availability zones; obtain information indicative of a designation of a first availability zone, of the plurality of availability zones, as a preferred availability zone; identify a subset of the plurality of database nodes within the first availability zone to store a plurality of replicas of the table, wherein the subset is selected to comprise at least a quorum quantity of database nodes; and cause the subset of the plurality of database nodes to store replicas of the table.

In at least one embodiment, the system also includes a request router that forwards requests to update the table to a database node in the subset of the plurality of database nodes in the first availability zone.

In at least one embodiment, the replica is stored on an additional database node in the first availability zone, instead of in another availability zone, when an availability parameter indicates tolerance for a decreased level of availability.

In at least one embodiment, a database node in the subset of database nodes in the first availability zone attempts to confirm quorum with one or more other database nodes in the subset prior to attempting to confirm quorum with database nodes not in the subset.

In at least one embodiment, the at least one memory stores further instructions that, in response to being executed by the at least one processor, cause the system to at least analyze network traffic associated with the table; and determine to designate the first availability zone as a preferred availability zone based, at least in part on a proportion of the network traffic associated with the first availability zone.

Figure 9:
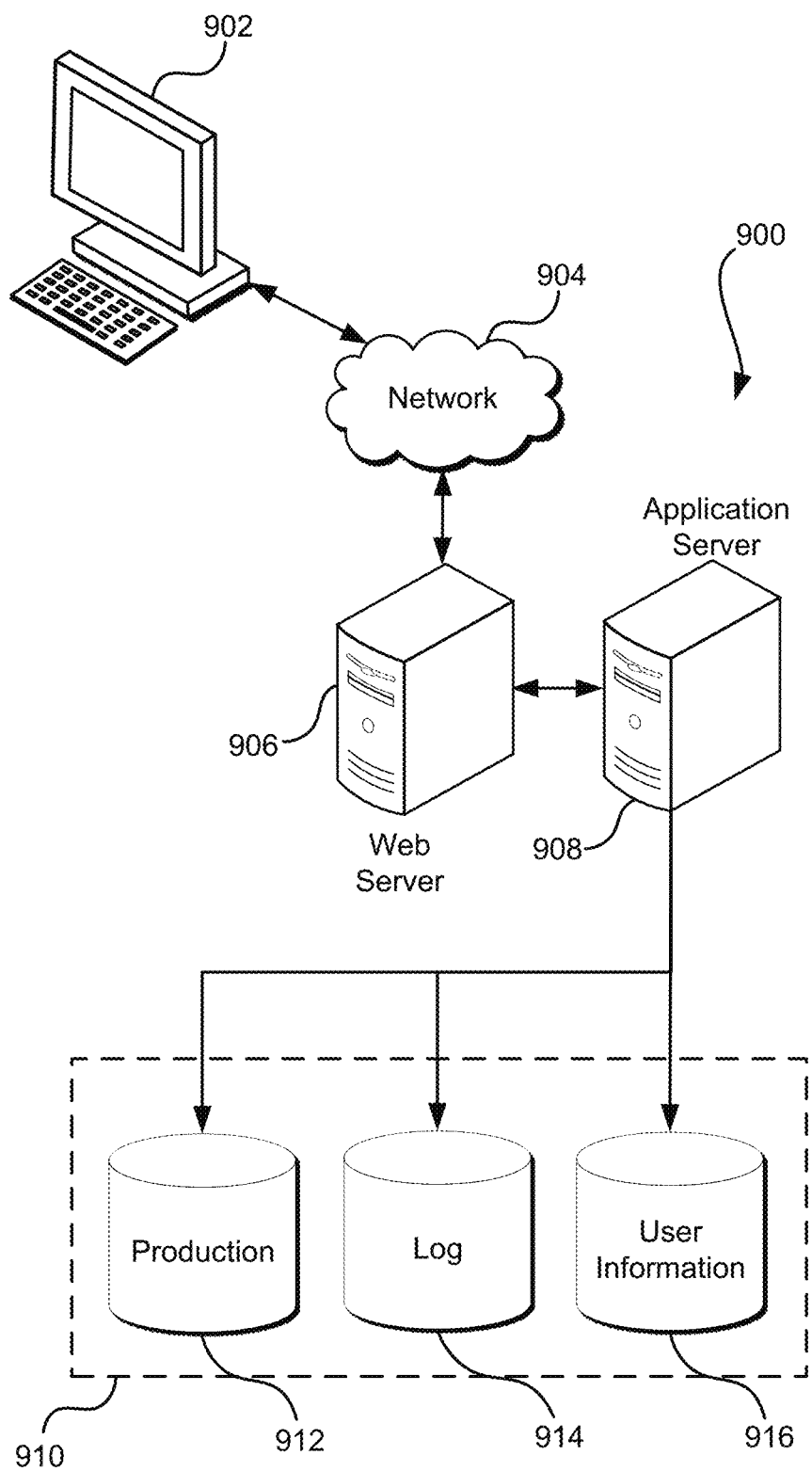
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory that stores computer-executable instructions that, in response to being executed by the at least one processor, cause the system to at least:
   obtain a request to store a database table in a distributed database comprising a plurality of database nodes located in a plurality of availability zones;
   obtain information indicative of a designation of a first availability zone, of the plurality of availability zones, as a preferred availability zone;
   identify a subset of the plurality of database nodes to store a plurality of replicas of the table, wherein the database nodes in the subset are located in the first availability zone, and wherein the subset comprises at least a quorum quantity of database nodes, the quorum quantity of database nodes sufficient to comply with a quorum policy where an updated table having an update does not reflect the update until at least the quorum quantity of database nodes in the first availability zone have applied the update to respective replicas of the table;
   cause at least the subset of the plurality of database nodes to store replicas of the table; and
   cause, based at least in part on the designation of a first availability zone as the preferred availability zone, placement of a streaming service in the first availability zone that provides a time-ordered sequence of events related to an operation of the distributed database, the streaming service configured to allow a client of the streaming service to receive a notification.

2. The system of claim 1, further comprising a request router that forwards requests to update the table to a database node in the subset of the plurality of database nodes in the first availability zone.

3. The system of claim 1, wherein the at least one memory storing further instructions that, in response to being executed by the at least one processor, cause the system to at least:
   determine to store a replica of the table on a database node in the first availability zone, instead of a database node in another availability zone, based at least in part on an availability parameter indicating tolerance for decreased availability.

4. The system of claim 1, wherein a first database node in the subset of the plurality of database nodes in the first availability zone attempts to confirm quorum with one or more other database nodes in the subset prior to attempting to confirm quorum with database nodes not in the subset.

5. The system of claim 1, wherein the at least one memory storing further instructions that, in response to being executed by the at least one processor, cause the system to at least:
   analyze network traffic associated with the table; and
   determine to designate the first availability zone as a preferred availability zone based, at least in part on a proportion of the network traffic associated with the first availability zone.

6. A method, comprising:
   receiving a request to store a collection of data in a distributed database comprising a plurality of database nodes located in a plurality of availability zones;
   obtaining information indicating of designating a first availability zone, of a plurality of availability zones, as a preferred availability zone; and
   causing, based at least in part on the designation:
   placement of a streaming service in the first availability zone that provides a time-ordered sequence of events related to an operation of the distributed database, the streaming service configured to allow a client of the streaming service to receive a notification, and
   a quantity of database nodes in the first availability zone to store replicas of the collection of data, wherein the quantity of database nodes sufficient for making a quorum determination complies with a quorum policy where a table update is not reflected until at least a quorum quantity of database nodes in the first availability zone have applied the update to respective replicas of the table.

7. The method of claim 6, wherein at least one database node, of the plurality of database nodes, stores a replica of the collection of data and is located in an availability zone other than the first availability zone.

8. The method of claim 6, further comprising:
   forwarding network traffic associated with the collection of data from a second availability zone to the first availability zone, the forwarding performed based at least in part on information indicating that the first availability zone is designated as the preferred availability zone.

9. The method of claim 6, further comprising:
determining a number of database nodes to maintain replicas of the collection of data outside of the preferred availability zone based, at least in part, on a parameter indicative of a tolerance for reduced availability.

10. The method of claim 6, further comprising:
configuring a database node in the preferred availability zone to attempt to make the quorum determination based on other database nodes also in the preferred availability zone, prior to attempting to make the quorum determination based on database nodes not in the preferred availability zone.

11. The method of claim 6, further comprising:
determining, based at least in part on the designation of the first availability zone as preferred, to maintain an index of the collection of data in the preferred availability zone.

12. The method of claim 6, further comprising:
providing a user interface comprising an element to select at least one of the preferred availability zones, a parameter indicative of tolerance to reduced availability, or a parameter indicative of emphasizing performance.

13. The method of claim 6, further comprising:
determining to locate a service associated with the distributed database in the first availability zone, based at least in part on the designation of the first availability zone as the preferred availability zone.

14. A non-transitory computer-readable storage medium having stored thereon executable instructions that, as a result of being executed by one or more processors of a computer system, cause the computer system to at least:
receive information indicating that a first availability zone, of a plurality of availability zones, is a preferred availability zone for maintaining replicas of a collection of data;
place, in the first availability zone, a service that provides a time-ordered sequence of events related to the maintaining replicas of the collection of data, the service configured to allow a client of the service to receive a notification;
determine a number of database nodes to maintain in the preferred availability zone, the number determined based at least in part on a number of nodes needed for a quorum determination; and
cause the determined number of database nodes to maintain the replicas of the collection of data in the first availability zone such that a table update is not reflected until at least a quorum quantity of database nodes in the first availability zone have applied the update to respective replicas of the table.

15. The non-transitory computer-readable storage medium of claim 14, wherein requests to update the collection of data are forwarded, based at least in part on the first availability zone being preferred, from a second availability zone to the first availability zone.

16. The non-transitory computer-readable storage medium of claim 14, wherein the number of database nodes to maintain the replicas is determined based, at least in part, on one or more parameters indicative of tolerance for interruption of availability.

17. The non-transitory computer-readable storage medium of claim 14, wherein the executable instructions further comprise executable instructions that, as a result of being executed by the one or more processors, cause the computer system to at least:
configure a database node in the first availability zone to attempt to confirm quorum with one or more other database nodes in the first availability zone prior to attempting to confirm quorum with database nodes not in the first availability zone.

18. The non-transitory computer-readable storage medium of claim 14, wherein the executable instructions further comprise executable instructions that, as a result of being executed by the one or more processors, cause the computer system to at least:
determine to designate the first availability zone as a preferred availability zone based, at least in part on network traffic directed to the first availability zone.

19. The non-transitory computer-readable storage medium of claim 18, wherein the network traffic comprises at least one of the requests to update the collection of data, a request to replicate a change to the collection of data, or a request to confirm a quorum decision.

20. The non-transitory computer-readable storage medium of claim 14, wherein the executable instructions further comprise executable instructions that, as a result of being executed by the one or more processors, cause the computer system to at least:
determine to change the designation of the first availability zone as the preferred availability zone based, at least in part, on a change to network traffic directed to the plurality of availability zones.

* * * * *